UNITED STATES PATENT OFFICE.

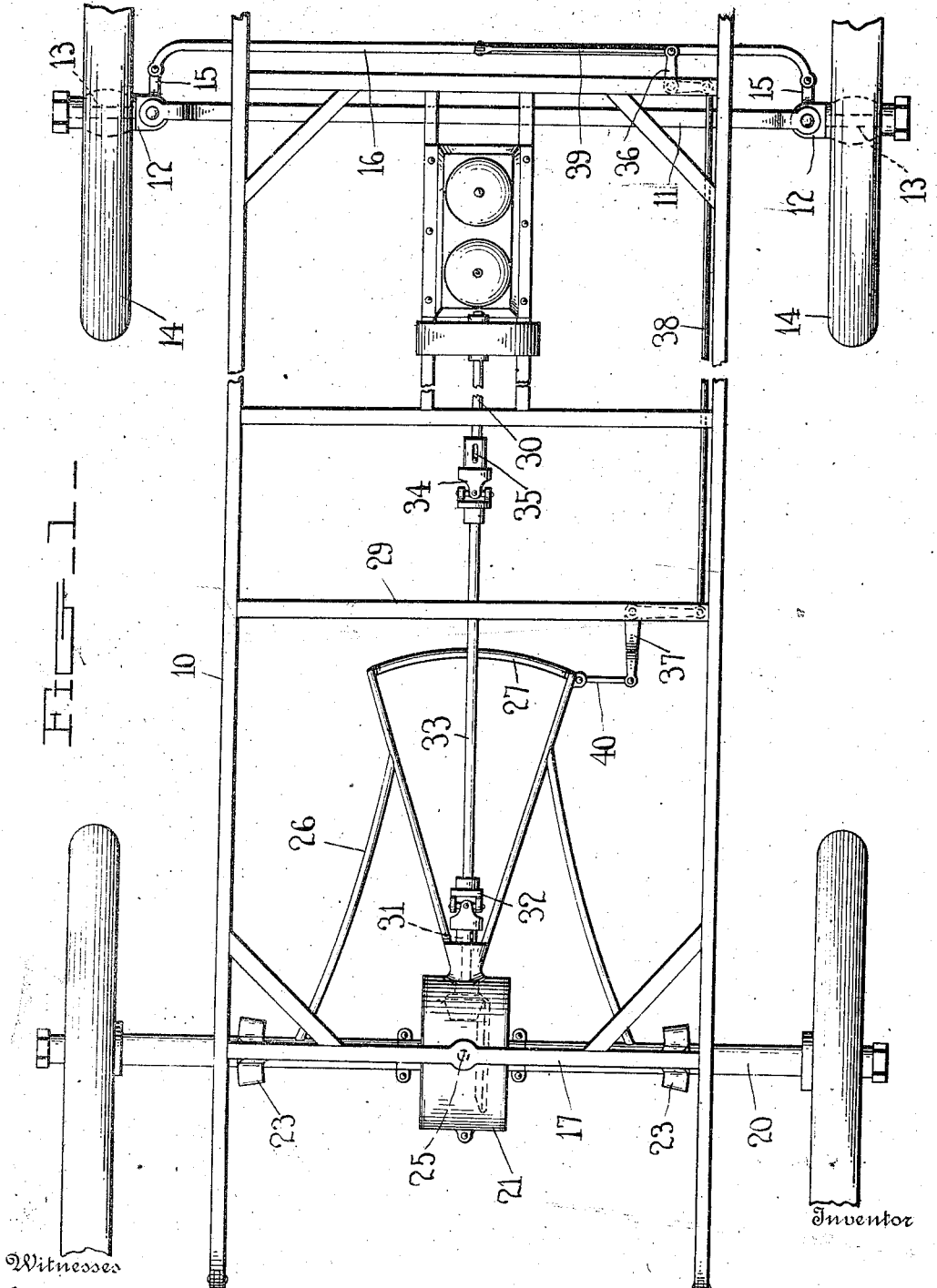

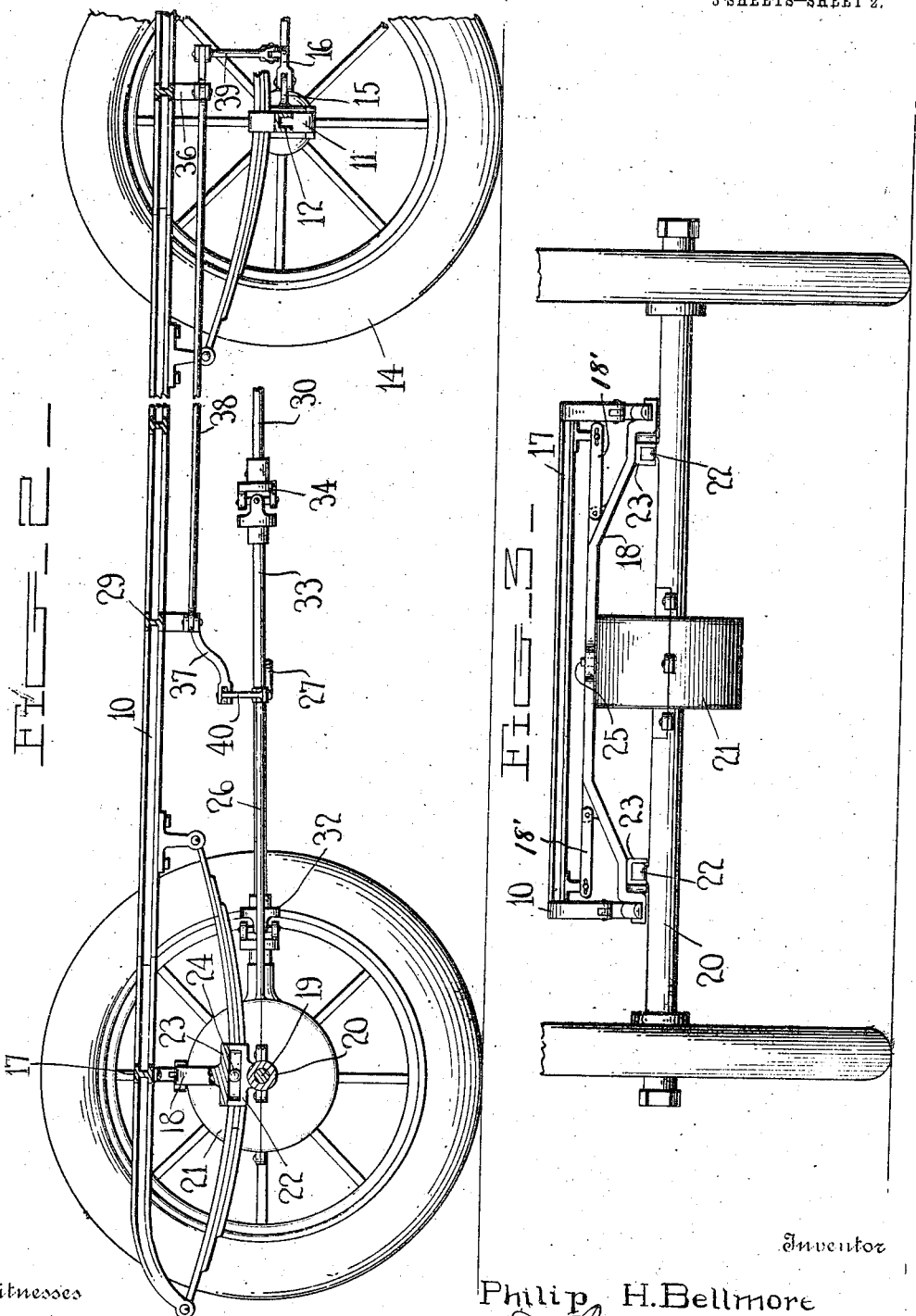

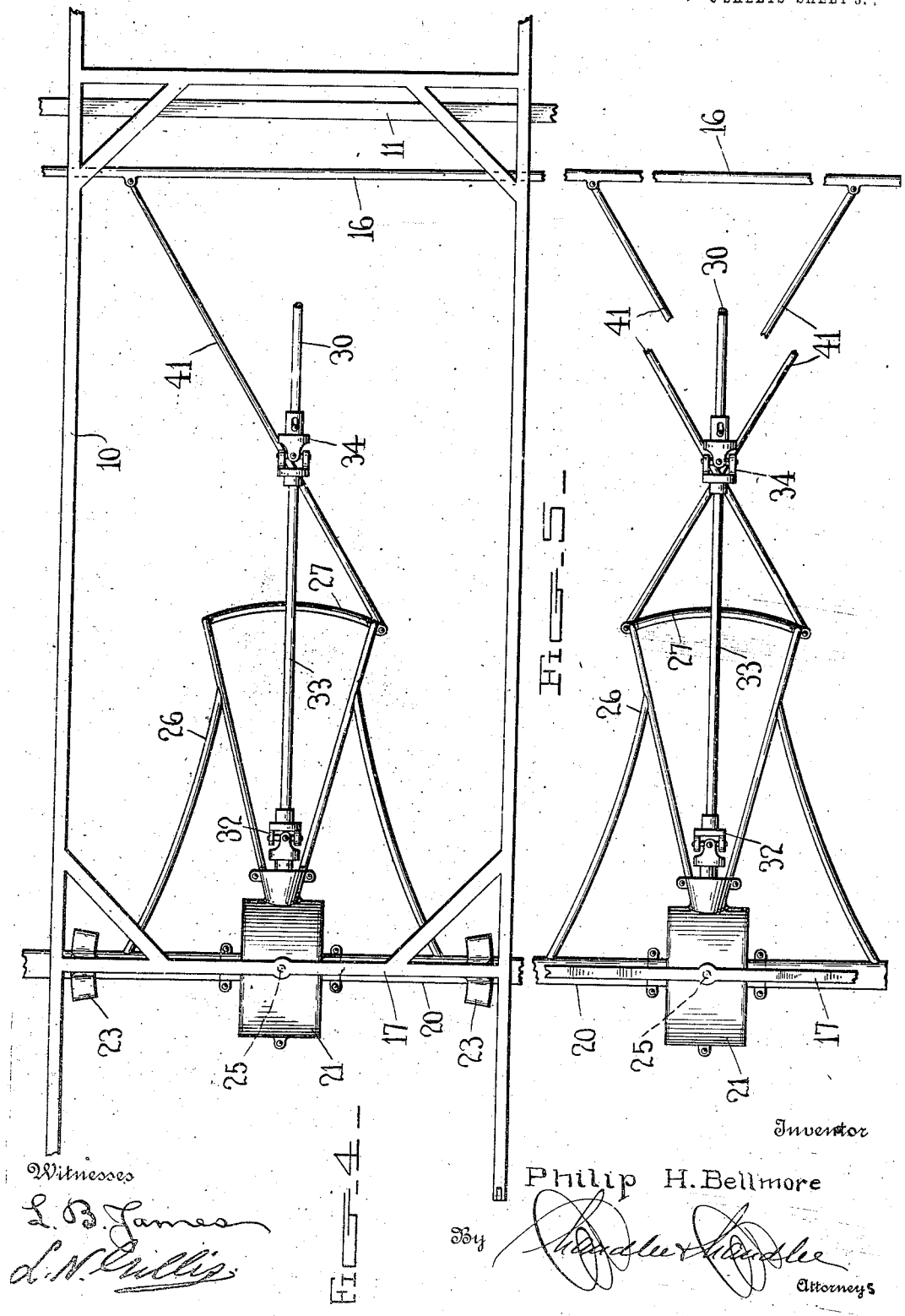

PHILIP H. BELLMORE, OF MISSOULA, MONTANA.

STEERING-GEAR FOR AUTOMOBILES.

1,014,439.   Specification of Letters Patent.   Patented Jan. 9, 1912.

Application filed February 10, 1910. Serial No. 543,084.

*To all whom it may concern:*

Be it known that I, PHILIP H. BELLMORE, a citizen of the United States, residing at Missoula, in the county of Missoula, State of Montana, have invented certain new and useful Improvements in Steering-Gear for Automobiles; and I do hereby declare the following to be a full, clear, and exact description of the invention such as will enable others skilled in the art to which it appertains to make and use the same.

This invention relates to automobiles and has special reference to a motor driven vehicle in which the front axle is provided with swiveling knuckles for carrying the front wheels and the rear axle is swiveled to swing in a horizontal plane.

The invention more particularly refers to a mechanism for swinging both the front and rear wheels of an automobile of this class, the front wheels swinging in one direction and the rear axle swinging bodily with its wheels in the opposite direction.

One object of the invention is to provide a novel form of mechanism of the character described which will enable an automobile to turn corners on curves of shorter radii than is possible where only one pair of wheels is swung.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a plan view of an automobile chassis with the major part of the mechanism removed in order to show the special features of this invention more clearly. Fig. 2 is a side elevation of the parts as shown in Fig. 1. Fig. 3 is a rear elevation of the parts disclosed in Fig. 1. Fig. 4 is a plan view showing a somewhat different arrangement for operating the wheels in the manner described. Fig. 5 is a second modification slightly different from that shown in Fig. 4.

Throughout the drawings the frame is indicated by the numeral 10 and at the forward end of this frame is the usual front axle 11 which is provided with the ordinary knuckles 12. These knuckles are each formed with a journal portion 13 to carry a wheel 14. Extending longitudinally of the frame from the journal portion are arms 15 and the arm 15 of one knuckle is connected to the arm 15 of the other knuckle by means of a tie rod 16.

In the form shown in Figs. 1 and 2 the tie rod 16 is arranged in front of the front axle while in the forms shown in Figs. 4 and 5 the tie rods are located behind the rear axle.

At the rear of the frame 10 there is provided a cross member 17 beneath which is a bolster 18 connected to the frame by links 18′. The rear axle, indicated at 19, is constructed in the usual manner of two parts and these parts, together with the differential gear, are incased, the casing for the axle sections being indicated at 20 while the gear casing is indicated at 21. The differential gear is of any preferred type and it is not deemed necessary here to disclose any special type of gear for this purpose. Upon the axle casings 20 are formed side bearing members 22 while upon the bolster 18 are other side bearing members 23, rollers 24 being provided between the axle and bolster side bearings. Upon the gear casing 21 there is provided a center pin 25 which is received in a suitable center pin bearing formed in the bolster 18. It will be observed that by this means of suspension the rear axle is free to swing in a horizontal plane. Extending forwardly from the casing 20 and 21 are lever members 26 which are united at their forward ends by a cross member 27.

The front wheels are connected to the usual steering wheel in any preferred manner and it is not deemed necessary here to disclose any particular manner as the invention does not embrace any special mechanism for moving the front wheels.

At 30 is shown the usual engine shaft and at 31 is the rear drive shaft. This drive shaft 31 is connected by a universal joint 32 with an intermediate shaft 33 which is in turn connected by a universal joint 34 to the motor driven shaft 30. One of the members of the universal joint 34 is arranged to slide longitudinally of the shaft whereon it is mounted and in the present instance provision is made for this sliding movement by connecting the forward member 34 to the shaft 30 with a pin and slot connection as indicated at 35. The purpose of this will be apparent when it is considered that as the rear axle is moved around its center the tendency is to lengthen the distance between the rear universal joint and the end of the shaft 30 so that provision must be made for such extension of the shaft.

In the form shown in Figs. 1, 2 and 3 there is provided on the forward portion of the frame a bell crank lever 36 and on the cross member 29 is a similar bell crank lever 37. Two of the arms of these levers extend in the same direction laterally while the remaining arms extend respectively, forwardly and rearwardly from their pivot points. The lateral arms of the levers 36 and 37 are connected by a link rod 38, the remaining arm of the lever 36 being connected to the tie bar 16 by a link rod 39 and the remaining arm of the lever 37 being connected to the lever by a link 40.

It will now be apparent that if the tie bar be drawn toward the right to move the wheels 14 into position so that the machine will be directed to the right the lever 36 will have its lateral arm forced backward and will push upon the link rod 38. This, in turn, will force the lateral arm of the lever 37 backward and will cause this lever to rotate in the direction of the hands of a clock with the consequence that the lever will be swung toward the left and the rear and front wheels thus caused to assume a more acute angle to each other than if the forward wheels only were acted upon.

In the form shown in Fig. 4 the tie bar 16 is, as previously noted, located to the rear of the front axle and this tie bar is connected to the lever by a link rod 41, said link rod extending from a point adjacent one side of the frame, across the center of the machine, and being connected to the lever adjacent the opposite side of the frame. The link rod thus occupies a diagonal position with relation to the center of the machine.

In the form shown in Fig. 5 the device is very similar to that shown in Fig. 4 with the exception that in place of the single rod 41 two link rods are employed each crossing from one side of the frame to the other as can be clearly seen from reference to that figure. Now, if the front wheels be moved to direct the machine to the left the tie bar 16 will move to the right. This will cause the link rod 41 to be pushed upon and will operate to move the forward end of the lever to the right with the consequence that the right side of the rear axle will be swung to the rear and the left side swung forward, thus causing the wheels carried by the rear axle to swing in the opposite direction to the front wheels.

There has thus been provided a simple and efficient device of the kind described and for the purpose specified.

Having thus described the invention, what is claimed as new, is:—

1. In an automobile, a frame including a rear bolster, a front axle, steering knuckles pivoted to the ends of said front axle and provided with front wheel journals, arms extending longitudinally of the frame from the journals, a tie rod connecting said arms, a casing swiveled to the rear bolster to swing in a horizontal plane, a rear axle carried in the casing, a lever including members extending forwardly from the casing on opposite sides of the pivot thereof, and a connection between the tie rod and the lever for simultaneously swinging the front wheel journals and the rear axle casing.

2. In an automobile, a frame including a rear bolster, a front axle, steering knuckles pivoted to the ends of said front axle and provided with front wheel journals, arms extending longitudinally of the frame from the journals, a tie rod connecting said arms, a casing swiveled to the rear bolster to swing in a horizontal plane, a rear axle carried in the casing, a lever including members extending forwardly from the casing on opposite sides of the pivot thereof, and a link rod disposed diagonally under the frame and pivotally connected at its ends to the lever and to the tie rod.

In testimony whereof, I affix my signature, in presence of two witnesses.

PHILIP H. BELLMORE.

Witnesses:
 EDWARD M. ERICKSEN,
 ANTON W. ERICKSEN.